United States Patent
Wang et al.

(10) Patent No.: US 7,952,864 B2
(45) Date of Patent: May 31, 2011

(54) MOTHERBOARD MODULE

(75) Inventors: Shi-Feng Wang, Shanghai (CN); Yong-Liang Hu, Shanghai (CN); Ji-Peng Xu, Shanghai (CN); Tsai-Kuei Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 75 days.

(21) Appl. No.: 12/493,072

(22) Filed: Jun. 26, 2009

(65) Prior Publication Data

US 2010/0259884 A1 Oct. 14, 2010

(30) Foreign Application Priority Data

Apr. 10, 2009 (TW) .............................. 98112019 A

(51) Int. Cl.
*G06F 1/16* (2006.01)

(52) U.S. Cl. ................... 361/679.33; 600/191; 248/553; 369/77.2

(58) Field of Classification Search ............. 361/679.02, 361/679.47, 679.34, 679.4, 679.45, 679.37, 361/679.33, 679.39, 679.46, 679.48; 600/300, 117, 191, 194; 324/358; 720/601; 312/223.1, 223.2, 223.3; 248/551, 552, 553, 304, 308, 146, 226.11; 369/75.1, 77.2

See application file for complete search history.

(56) References Cited

U.S. PATENT DOCUMENTS

| | | | |
|---|---|---|---|
| 2007/0055116 A1* | 3/2007 | Clark et al. | .................... 600/300 |
| 2008/0037209 A1* | 2/2008 | Niazi et al. | ..................... 361/683 |
| 2010/0027214 A1* | 2/2010 | Wu et al. | .................. 361/679.47 |

\* cited by examiner

*Primary Examiner* — Hung V Duong
(74) *Attorney, Agent, or Firm* — J.C. Patents

(57) ABSTRACT

A motherboard module adapted for connecting pluggably to a case includes a tray, a motherboard, a hard disk cage, and at least one hard disk drive. The tray has a bottom board, a plurality of fixing portions, and a front board. The front board is disposed at a side of the bottom board. The motherboard is disposed on the bottom board. The hard disk cage is fixedly connected to the fixing portions and above the tray, and has a hole corresponding to a hole of the front board. The hard disk drive may be disposed pluggably in the cage.

9 Claims, 3 Drawing Sheets

US 7,952,864 B2

MOTHERBOARD MODULE

CROSS-REFERENCE TO RELATED APPLICATION

This application claims the priority benefit of Taiwan application serial no. 98112019, filed Apr. 10, 2009. The entirety of the above-mentioned patent application is hereby incorporated by reference herein and made a part of this specification.

BACKGROUND OF THE INVENTION

1. Field of the Invention

The present invention relates to a motherboard module, particularly to a motherboard module having an integrated structure and adapted to be disposed to a case.

2. Description of Related Art

Recently, the commonly used server host in the industry is, for example, a stackable and serially-connected rack mount computer. In the design of a rack mount computer, a CPU, a chipset, a memory, and a hard disk are respectively disposed to form a host. Each of the hosts is disposed in the case, such that space is saved, and replacement is easy.

In conventional art, a motherboard is always fixed inside a case. Only a hard disk drive or an optical disc drive is able to be pluggably disposed on the motherboard or the fixed structure thereof. When replacement of the entire motherboard is required, since the motherboard cannot be disassembled easily, the efficiency of maintenance or hardware replacement is affected.

SUMMARY OF THE INVENTION

The present invention provides a motherboard module that is easy to be assembled or dissembled and can be pluggably connected to a case.

The motherboard module of the present invention is adapted to be pluggably connected to the case. The motherboard module includes a tray, a motherboard, a hard disk cage, and at least a hard disk drive. The tray has a bottom board, a plurality of fixing portions, and a front board. The front board is disposed at a side of the bottom board. The fixing portions are disposed at two opposite sides of the tray, and the two opposite sides are adjacent to the front board respectively. The motherboard is disposed on the bottom board. The hard disk cage is fixedly connected to the fixing portions and located above the tray, and has a hole corresponding to at least a hole of the front board. The at least a hard disk drive may be pluggably disposed in the hard disk cage.

In one embodiment of the present invention, the tray has a handle structure including a holder, a resilient element, and a hook. The holder is rotatably connected to another side of the bottom board opposite to the motherboard. The handle is rotated to an angle, such that a side of the handle interferes with the bottom board. The resilient element and the hook are fixedly connected to the bottom board and at the same side with the holder. The hook is hooked up to an end of the holder, whereas the resilient element pushes against a side of the holder.

In one embodiment of the present invention, the tray has a plurality of side boards disposed at two opposite sides of the bottom board and adjacent to the front board respectively. Each of the side boards has a positioning cut located at another end of each of the side boards opposite to the front board and sunk in the direction of the front board. A case to which a motherboard is mounted has a plurality of positioning bumps. When a motherboard module is disposed in a case, the positioning bumps and the positioning cuts interfere with one another, such that the motherboard module is positioned to a disposing position corresponding to the case.

In one embodiment of the present invention, the motherboard has a plurality of memory sockets and a plurality of chip pads.

In one embodiment of the present invention, the motherboard further includes a connector disposed at a side of the motherboard opposite to the front board, i.e. the end portion of the motherboard. The connector is adapted to be directly connected to a connecting portion disposed in the case. Moreover, the bottom board may have a connector fixing end located at a side of the bottom board and corresponding to the position of the connector. An end of the motherboard is fixedly connected to the connector fixing end.

In one embodiment of the present invention, the front board has at least a hole, and at least a hard disk drive passes through the at least a hole disposed to the hard disk cage.

In one embodiment of the present invention, the hard disk cage has a hard disk back board, and the motherboard has a slot. The hard disk back board is connected between the hard disk cage and the slot. At least a hard disk drive is electrically connected to the hard disk back board and thereby connected to the motherboard. In addition, the slot and the hard disk back board can be peripheral component interconnect express (PCI-E) interfaces.

Based on the above, the motherboard module of the present invention is integrated by disposing the motherboard, the hard disk cage, and the hard disk drive on the tray, and the module is easy to be assembled to and disassembled from the case. In addition, the motherboard module may also have a handle structure and a positioning cut, such that the module can be assembled and dissembled more easily.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
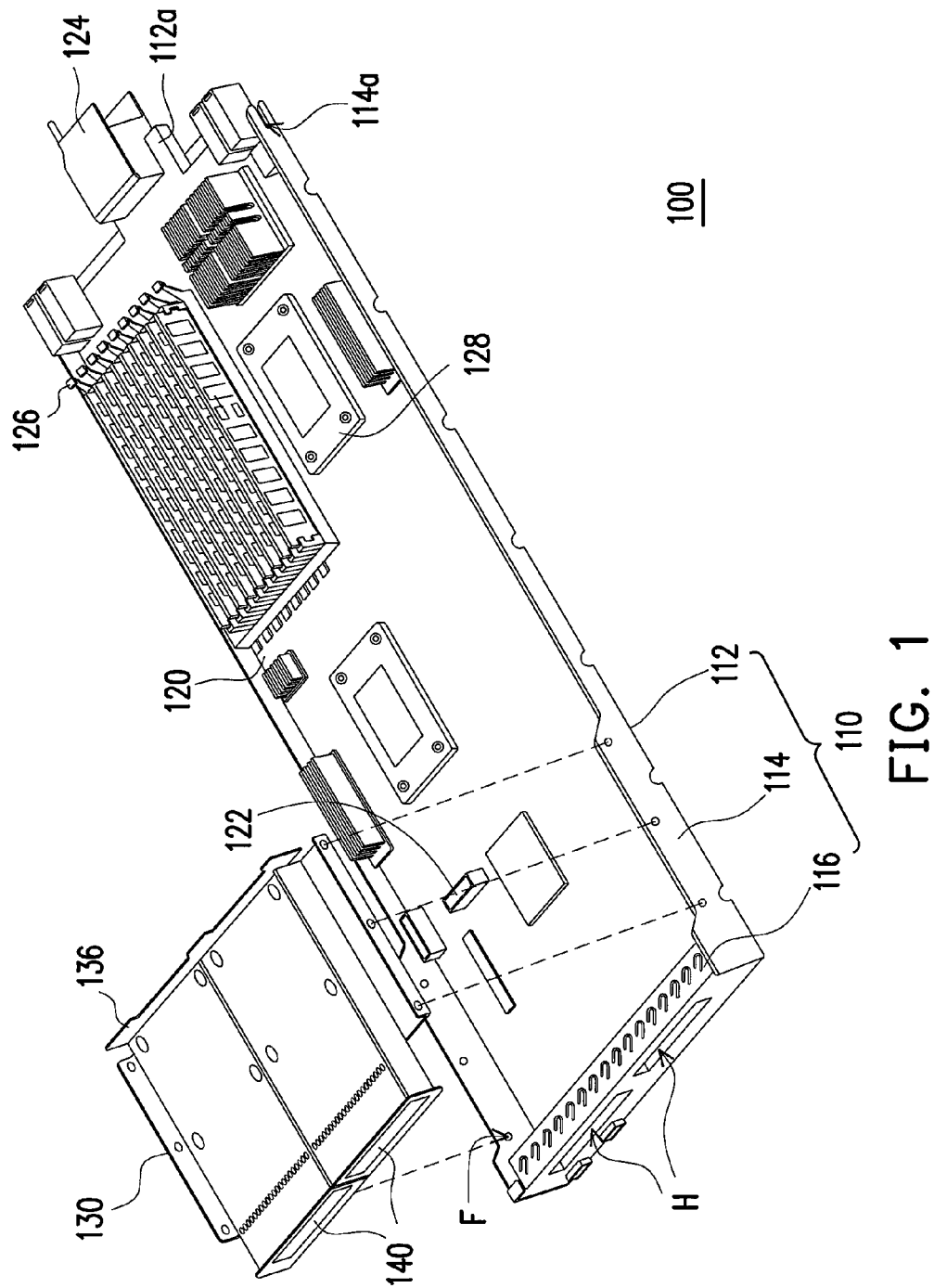
FIG. 1 is a schematic view of a motherboard module according to one embodiment of the present invention.
Figure 2:
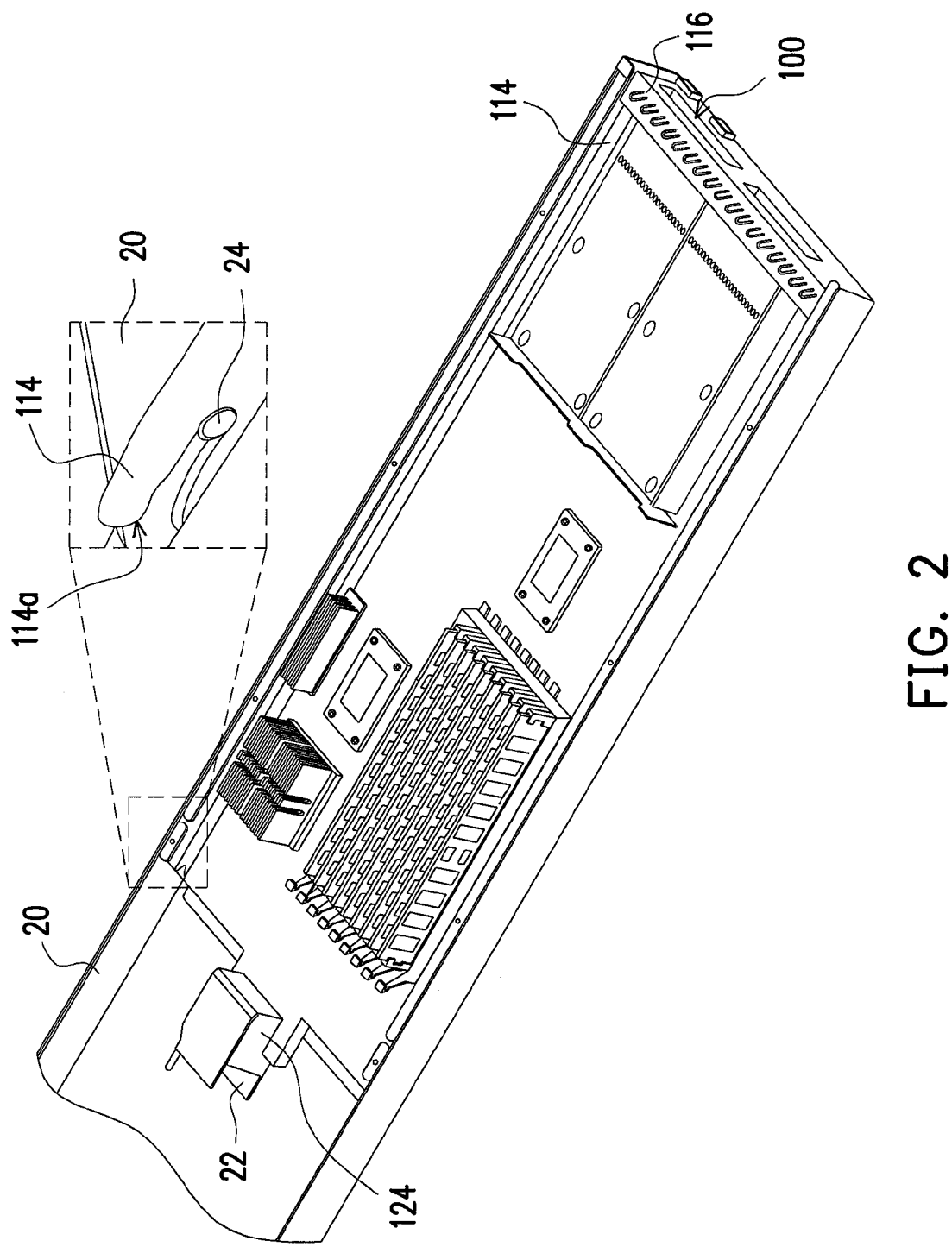
FIG. 2 is a schematic view illustrating the motherboard module of FIG. 1 disposing a motherboard.

FIG. 1 is a schematic view of a motherboard module according to one embodiment of the present invention. FIG. 2 is a schematic view illustrating the motherboard module of FIG. 1 disposing a motherboard. Referring to FIGS. 1 and 2, a motherboard module 100 is adapted to be connected to a case 20, and the case 20 has a connecting portion 22.

The motherboard module 100 includes a tray 110, a motherboard 120, a hard disk cage 130, and at least a hard disk drive 140. The tray 110 has a bottom board 112, a plurality of fixing portions F, and a front board 116. The front board 116 is disposed at a side of the bottom board 112. In this embodiment of the present invention, the tray 110 may have two side boards 114 disposed at two opposite sides of the bottom board 112 and adjacent to the front board 116 respectively. The fixing portions F are on the two side boards 114.

The motherboard 120 has a slot 122 and a connector 124 disposed on the bottom board 112.

The connector 124 is disposed at a side of the motherboard 120 for connecting to the connecting portion 22 of the case 20.

The connector 124 is directly connected to the connecting portion 22 without using connecting wires or other connecting devices. The slot 122 is disposed on the motherboard 120 for connecting to the hard disk cage 130. The hard disk cage 130 is fixedly connected to the fixing portions F, such that the hard disk cage 130 is disposed on the tray 110.

In this embodiment of the present invention, the front board 116 and two side boards 114 can be integrated and respectively disposed on three of the sides of the bottom board 112. The fixing portions F on the side boards 114 may be screw holes to which a mounted object may be fastened between the two side boards 114.

In this embodiment of the present invention, the front board 116 has two holes H, and the hard disk cage 130 also has holes directly facing the holes H. When assembled, the hard disk drive 140 may be disposed in the hard disk cage 130 through the holes H. Moreover, the hard disk cage 130 may also have a hard disk back board 136. The hard disk back board 136 is connected between the slot 122 and the hard disk cage 130, and has a contact point (not shown in the drawings) corresponding to the position in the hard disk cage 130. The hard disk drive 140 disposed in the hard disk cage 130 can be electrically connected to the hard disk back board 136 and thereby electrically connected to the slot 122 of the motherboard 120. The hard disk back board 136 has a gold-finger interface in coordination with the slot 122. Therefore, when using the back board 136 to connect the hard disk drive 140 and the slot 122, no cables are required to be used between the hard disk drive 140 and the motherboard 120, such that the time for assembling and organizing cables is saved. In addition, in this embodiment of the present invention, the slot 122 and the hard disk back board 136 may be peripheral component interconnect express interfaces, such that the slot 122 and the hard disk back board 136 have sufficient data transmission speed so as to increase the operating performance of the motherboard module 100.

In this embodiment of the present invention, the motherboard 120 may also have a plurality of memory sockets 126 and a plurality of chip pads 128. The motherboard 120, in addition to being connected to the hard disk drive 140, is also disposed a processor, a chip set, and a memory thereon, such that the motherboard module 100 becomes one of the expansion modules disposed to the server.

In this embodiment of the present invention, each of the side boards 114 has a positioning cut 114a located at another end of each of the side boards 114 opposite to the front board 116 and sunk in the direction of the front board 116. The case 20 has a plurality of positioning bumps 24. When the motherboard module 100 is disposed in the case 20, each of the positioning cuts 114a interferes with the corresponding positioning bump 24, so as to guide the motherboard module 100 to move to a disposing position of the case 20 corresponding to the connecting portion 22, such that the connector 124 is accurately connected to the connecting portion 22 of the case 20.

Figure 3:
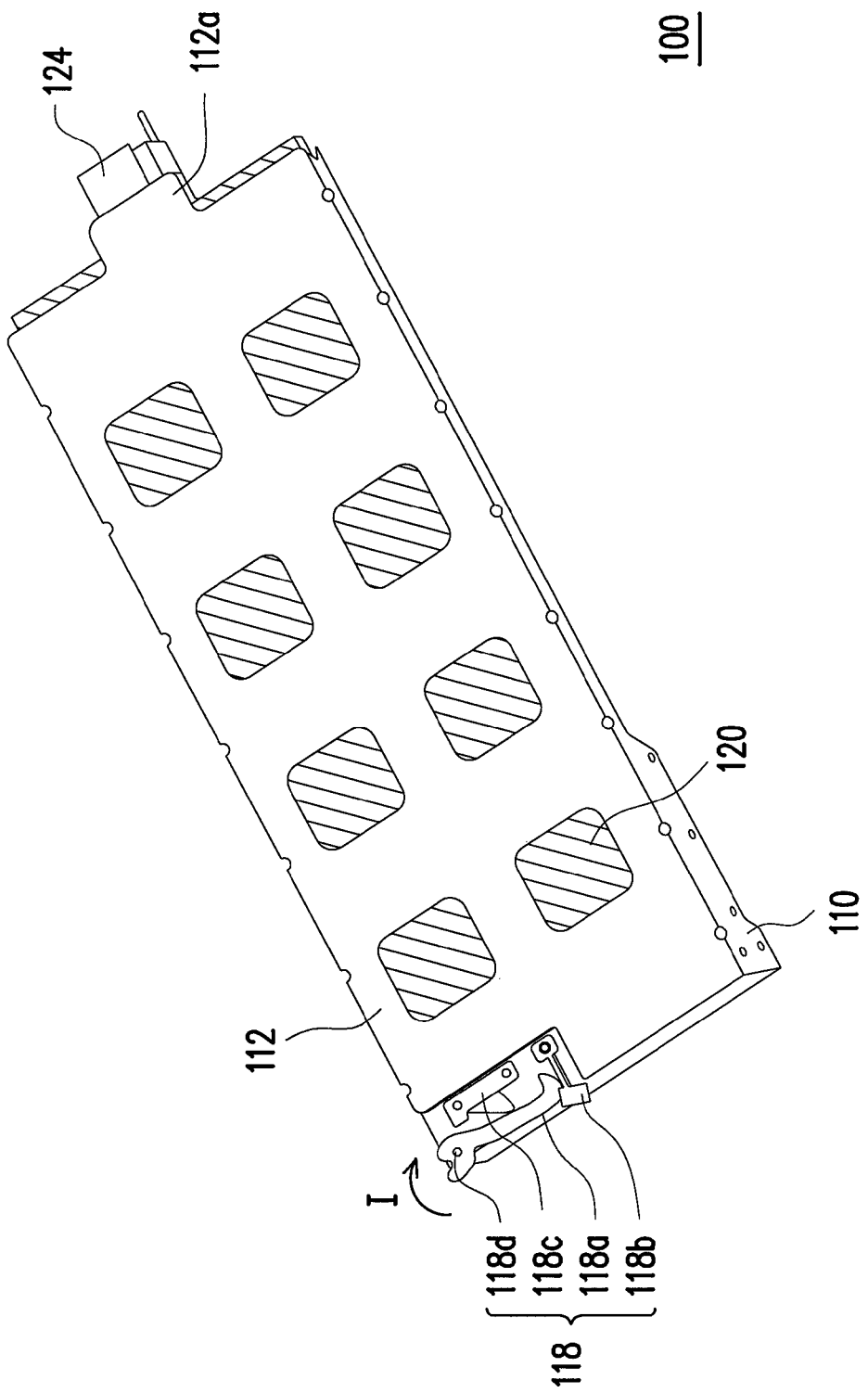
FIG. 3 is schematic view of another side of the motherboard module of FIG. 1.

FIG. 3 is a schematic view of another side of the motherboard module of FIG. 1. Referring to FIG. 3, the tray 110 in this embodiment has a handle structure 118. The handle structure 118 includes a holder 118a, a resilient element 118b, and a hook 118c. The holder 118a has a rotating axis 118d through which the holder 118a is connected to another side of the bottom board 112 opposite to the motherboard 120. The resilient element 118b and the hook 118c are fixedly connected to the bottom board 112 and located at a same side of the bottom board 112 with the holder 118a. When the holder 118a is at an initial position, the hook 118c is hooked up to an end of the holder 118a, and the resilient element 118b pushes against a side of the holder 118a, so as to fix the holder 118a at the initial position.

When users need to disassemble the motherboard module 100 from the case 20, first the hook 118c is pulled to eliminate the interference of the hook 118c to the holder 118a, and the holder 118a is sprung out due to the elastic force of the resilient element 118b. Next the holder 118a deviated from the initial position is rotated along a direction I, such that an end of the holder 118a leans against the bottom board 112. In the meantime, the holder 118a is continued to be exerted force thereon. By using a rotating axis 118d as a pivot, the bottom board 112 is levered to exert force thereon, such that the motherboard module 100 is disassembled from the case 20.

In addition, in this embodiment, the bottom board 112 has a connector fixing end 112a located at a side of the bottom board 112 and corresponding to the position of the connector 124. When being assembled or disassembled, the motherboard module 100 exerts greater force on the connector 124, so one end of the motherboard 120 to which the connector 124 is disposed has to be fixed to the connector fixing end 112a, such that the connector 124 is stably fixed to a side of the motherboard module 100. As a result, when the motherboard module 100 is assembled or disassembled, the force exerted thereon does not damage the motherboard 120.

Based on the above, the motherboard module of the present invention has a hard disk cage in which a hard disk drive is disposed. The hard disk cage and the motherboard are both disposed on a tray, such that the motherboard module becomes an integrated expansion module that is easily disposed to the server host so as to expand the performance of the server host. In addition, the motherboard module has a handle structure and a positioning cut. When the motherboard module is disposed in the case, the positioning cut and positioning bumps of the case interfere with one another, so as to guide the motherboard module into a disposing position, such that the connector of the motherboard module may be accurately connected to the connecting portion of the case. When being disassembled, the motherboard module may be exerted force thereon using the handle structure, such that the module is easily disassembled, and the damage to the connector and the connecting portion due to improperly exerted force is avoided.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A motherboard module adapted for pluggably connecting to a case, the motherboard module comprising:
   a tray having a bottom board, a plurality of fixing portions, and a front board disposed at a side of the bottom board and having at least a hole;
   a motherboard disposed on the bottom board;

a hard disk cage fixedly connecting to the fixing portions and located above the tray, and having a hole or holes corresponding to the at least a hole of the front board; and at least a hard disk drive sequentially passing through the hole of the front board and the hole of the hard disk cage, and pluggably disposed in the hard disk cage, wherein the hard disk drive is drawn out from the case along the same movement direction of the tray.

2. The motherboard module according to claim 1, wherein the tray has a handle structure comprising a holder, a resilient element, and a hook, the holder is rotatably connected to another side of the bottom board opposite to the motherboard, the holder rotates to an angle such that an end of the holder leans against the bottom board, the resilient element and the hook are fixedly connected to the bottom board and at a same side with the holder, the hook hooks up to an end of the holder, and the resilient element pushes against a side of the holder.

3. The motherboard module according to claim 1, wherein the tray has a plurality of side boards disposed at two opposite sides of the bottom board and respectively adjacent to the front board, each of the side boards has a positioning cut located at another end of each of the side boards opposite to the front board and sunk in the direction of the front board, the case has a plurality of positioning bumps, and when the motherboard module is disposed in the case, the positioning bumps interfere with the positioning cuts to guide the motherboard module to move to a disposing position corresponding to the case.

4. The motherboard module according to claim 1, wherein the motherboard further comprises a connector disposed at a side of the motherboard opposite to the front board, and the connector is adapted for directly connecting to a connecting portion disposed in the case.

5. The motherboard module according to claim 4, wherein the bottom board has a connector fixing end located at a side of the bottom board and corresponding to the position of the connector, and an end of the motherboard is fixedly connected to the connector fixing end.

6. The motherboard module according to claim 1, wherein the motherboard module has a plurality of memory sockets and a plurality of chip pads.

7. The motherboard module according to claim 1, wherein the front board has at least a hole, and the at least a hard disk passes through the at least a hole and is disposed to the hard disk cage.

8. The motherboard module according to claim 1, wherein the hard disk cage has a hard disk back board, the motherboard has a slot, the hard disk back board is connected between the hard disk cage and the slot, and the at least a hard disk drive is electrically connected to the hard disk back board and thereby connected to the motherboard.

9. The motherboard module according to claim 8, wherein the slot and the hard disk back board are peripheral component interconnect express interfaces.

\* \* \* \* \*